United States Patent [19]
Kaji et al.

[11] Patent Number: 5,834,570
[45] Date of Patent: Nov. 10, 1998

[54] EPOXY RESIN COMPOSITION

[75] Inventors: Masashi Kaji, Kitakyushu; Takanori Aramaki, Fukuoka-ken; Kazuhiko Nakahara, Kitakyushu; Hisayuki Nagino, Fukuoka-ken, all of Japan

[73] Assignee: Nippon Steel Chemical Co., Ltd., Tokyo, Japan

[21] Appl. No.: 917,745

[22] Filed: Aug. 27, 1997

Related U.S. Application Data

[63] Continuation of Ser. No. 591,263, filed as PCT/JP94/00918, Jun. 7, 1994 published as WO94/29363, Dec. 22, 1994, abandoned.

[30] Foreign Application Priority Data

Jun. 8, 1993 [JP] Japan .................................. 5-163930

[51] Int. Cl.$^6$ .................................................. C08F 283/00
[52] U.S. Cl. .................. 525/481; 525/523; 525/534; 523/400; 549/541
[58] Field of Search ............................ 549/541; 523/400; 525/481, 523, 534

[56] References Cited

U.S. PATENT DOCUMENTS

| | | | |
|---|---|---|---|
| 3,095,429 | 6/1963 | Smith et al. | 260/348 |
| 3,413,320 | 11/1968 | Cofer | 260/348 |
| 3,720,645 | 3/1973 | Nistri et al. | 528/87 |
| 4,421,897 | 12/1983 | Gutekunst et al. | 525/113 |
| 4,935,101 | 6/1990 | Shum et al. | 203/48 |
| 5,043,184 | 8/1991 | Fuji et al. | 427/96 |
| 5,098,965 | 3/1992 | Bauer et al | 525/507 |
| 5,294,683 | 3/1994 | Cotting et al. | 525/524 |
| 5,395,915 | 3/1995 | Iimuro et al. | 528/129 |

FOREIGN PATENT DOCUMENTS

| | | |
|---|---|---|
| 61-47725 | 3/1986 | Japan . |
| 62-115021 | 5/1987 | Japan . |
| 62-115057 | 5/1987 | Japan . |
| 4-183709 | 6/1992 | Japan . |
| 4-198211 | 7/1992 | Japan . |
| 4-288317 | 10/1992 | Japan . |
| 4-372619 | 12/1992 | Japan . |

OTHER PUBLICATIONS

Lee et al, "Handbook of Epoxy Resins", McGraw Hill Pub., pp. 5–16 to 5–18 and 14–1 to 14–4, 1982.

*Primary Examiner*—Randy Gulakowski
*Attorney, Agent, or Firm*—Nikaido, Marmelstein, Murray & Oram LLP

[57] ABSTRACT

An epoxy resin composition of this invention is obtained by solidifying epoxy resins represented by the following general formula (1) (wherein G is glycidyl group and $R^1$ to $R^8$ are hydrogen atoms, halogen atoms or hydrocarbon groups with 1 to 6 carbon atoms, and n is an integer of 0 to 10) by crystallization and adding epoxy resin curing agents to the resulting solid. It shows good flow and low moisture absorption, cures with excellent heat resistance at soldering temperature and is useful for a variety of applications, in particular, for encapsulating semiconductor devices.

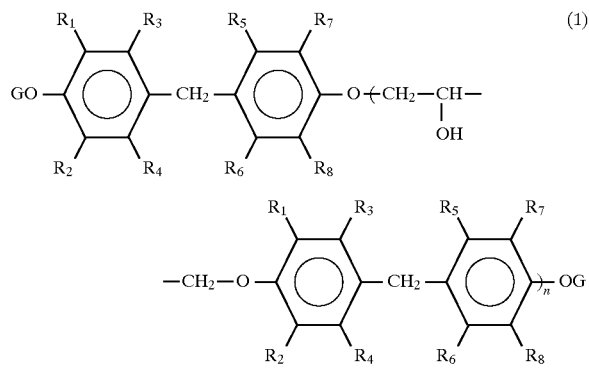

2 Claims, No Drawings

EPOXY RESIN COMPOSITION

This application is a continuation of application Ser. No. 08/591,263 filed Dec. 6, 1995, now abandoned.

This application is a continuation-in-part application of International PCT Application No. PCT/JP94/00918, filed on Jun. 7, 1994 published as WO94/29363, Dec. 22, 1994.

FIELD OF TECHNOLOGY

This invention relates to an epoxy resin composition which shows good flow and low moisture absorption, cures with excellent heat resistance at soldering temperature and is useful for a variety of applications, in particular, for encapsulating semiconductor devices.

BACKGROUND TECHNOLOGY

Resin compositions mainly consisting of epoxy resins have been used extensively as encapsulants for semiconductors. In recent years, the process for packaging parts to form printed circuit boards is undergoing a change from the conventional insertion to surface mounting. In the surface mounting technology, a package is heated in whole up to the soldering temperature accompanied by a rapid expansion of the volume of moisture therein contained and this causes a major problem of package cracking. Moreover, the phenomenon of package cracking is becoming a matter of serious concern in recent years as a result of rapid technical developments such as larger scale integration of semiconductor devices, enlarged size of devices and finer pitches in lines and spaces in patterning. Package cracking can be prevented by such processes as toughening of resin structures, strengthening by increased addition of silica as filler and lowering of moisture absorption.

In order to solve the aforementioned problems, it is desirable to have epoxy resins of low moisture absorption and low low viscosity. Bisphenol A-based epoxy resins are generally used as low-viscosity epoxy resins. However, these low-viscosity materials are liquid at normal temperatures and can be used with difficulty as transfer molding composition. Furthermore, the epoxy resins in question are not sufficient in respect to heat resistance, mechanical strength and moisture resistance.

Japan Kokoku Tokkyo Koho No. Hei 4-7365 (1992) proposes epoxy resin compositions mainly consisting of biphenyl-derived epoxy resins with improved handling qualities, heat resistance and toughness for encapsulation of semiconductor devices. The compositions in question, however, do not satisfy the requirement of low moisture absorption.

Accordingly, an object of this invention is to provide an epoxy resin composition which shows good flow and low moisture absorption, cures with excellent heat resistance at soldering temperature and is useful for a variety of applications, in particular, for encapsulating semiconductor devices.

DISCLOSURE OF THE INVENTION

This invention relates to an epoxy resin composition which is obtained by solidifying epoxy resins of the following general formula (1) (wherein G is glycidyl group and $R^1$ to $R^8$ are hydrogen atoms, halogen atoms or hydrocarbon groups with 1 to 6 carbon atoms, and n is an integer of 0 to 10) by crystallization and adding epoxy resin curing agents to the resulting solid.

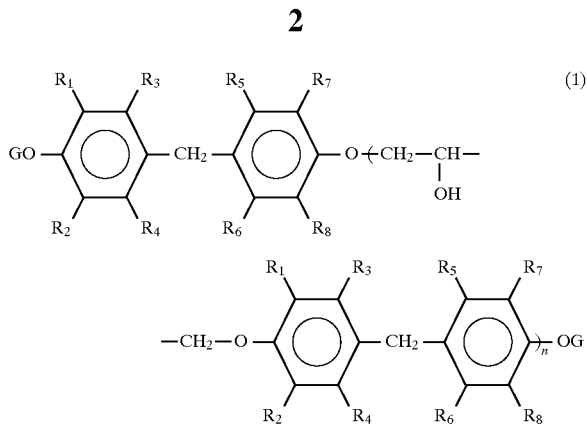

The epoxy resins represented by the aforementioned general formula (1) are prepared by treating bisphenol F or its derivatives of the following general formula (2) (wherein $R^1$ to $R^8$ are hydrogen atoms, halogen atoms or hydrocarbon groups with 1 to 6 carbon atom) with excess epihalohydrin. This reaction can be carried out in the same manner as the normal epoxidation reaction.

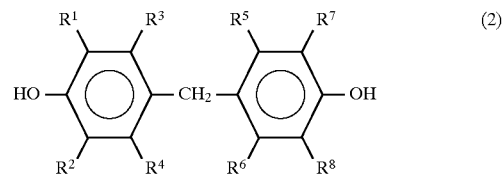

For example, bisphenol F or its derivative is dissolved in excess epihalohydrin and the solution is heated in the range of 50° to 150° C., preferably 60° to 120° C., for 1 to 10 hours in the presence of an alkali metal hydroxide such as sodium hydroxide. The alkali metal hydroxide is used in an amount of 0.8 to 2 mol, preferably 0.9 to 1.2 mol, per 1 mol of bisphenol F or its derivative. Upon completion of the reaction, the excess epihalohydrin is distilled off and the residue is dissolved in a solvent such as toluene and methyl isobutyl ketone, filtered, washed with water for removal of inorganic salts, and stripped of the solvent by distillation to give epoxy resins. It is desirable for the resins thus obtained to show an epoxy equivalent of 250 or less and contain a small amount of dimers and oligomers.

The aforementioned epoxy resins are ordinarily liquid at normal temperatures and it is necessary to crystallize them before use in this invention. Crystallization can be effected with the use of a solvent or by addition of seed crystals prepared in advance. Solvents suitable for the former process include alcohols such as methanol, ethanol and isopropyl alcohol and hydrocarbons such as pentane, hexane and heptane. This crystallization is carried out substantially perfectly, namely, until viscous uncrystallized materials adhered on the surface of crystals are not observed or until a dry blend of obtained crystals becomes possible.

In the aforementioned general formula (1), the substituents $R^1$ to $R^8$ designate hydrogen atoms, halogen atoms or hydrocarbon groups with 1 to 6 carbon atoms. Though n is an integer of 0 to 10, a ratio of n=0 is more than 80 mole %, preferably more than 90 mole % for smooth more than 80 mole %, preferably more than 90 mole % for smooth crystallization thereof.

Examples of the hydrocarbon groups are methyl, ethyl, isopropyl, tert-butyl, tert-amyl and phenyl. The melting point of the crystalline epoxy resins in use is desirably in the range of 40° to 130° C., preferably 50° to 120° C. Resins melting lower than this range show a blocking tendency during storage while resins melting higher show poor solubility characteristics and reduced miscibility with curing agents.

The following exemplify crystalline epoxy resins with desirable melting point, viscosity, and reactivity in use and desirable heat and moisture resistance after curing: crystalline diglycidyl ether of 3,3'-dimethyl-4,4'-dihydroxydiphenylmethane with melting point 40°–55° C.; crystalline diglycidyl ether of 3,3',5,5'-tetramethyl-4,4'-dihydroxydiphenylmethane with melting point 70°–85° C.; crystalline diglycidyl ether of 2,2',3,3',5,5'-hexamethyl-4,4'-dihydroxydiphenylmethane with melting point 90°–105° C.; and diglycidyl ether of 2,2'-dimethyl-5,5'-di-tert-butyl-4,4'-dihydroxydiphenylmethane with melting point 85°–100° C. Epoxy resins melting below the aforementioned temperature range contain a larger amount of dimers and oligomers, which undesirably causes problems of increased viscosity and decreased heat resistance.

In the cases where epoxy resin compositions of this invention are used in protection, insulation or encapsulation of electric and electronic parts, materials of high purity are used advantageously and their content of hydrolyzable chlorine is preferably 500 ppm or less.

Curing agents known for epoxy resins such as polyhydric phenols, acid anhydrides and aromatic and aliphatic amines can be used for the resin compositions of this invention. For example, the polyhydric phenols include dihydric phenols such as bisphenol A, bisphenol F, bisphenol S, fluorenebisphenol, 4,4'-dihydroxybiphenyl, 2,2'-dihydroxybiphenyl, hydroquinone, resorcin and naphthalenediols, trihydric and higher phenols such as tris(4-hydroxyphenyl)methane, 1,1,2,2-tetrakis(4-hydroxyphenyl)ethane, phenol novolaks, o-cresol novolaks, naphthol novolaks, and poly(vinylphenol), and polyphenols synthesized from phenols, naphthols or dihydric phenols such as bisphenol A, bisphenol F, bisphenol S, fluorenebisphenol, 4,4'-dihydroxybiphenyl, 2,2'-dihydroxybiphenyl, hydroquinone, resorcin and naphthalenediols and condensation agents such as formaldehyde, acetaldehyde, benzaldehyde, p-hydroxybenzaldehyde and p-xylylene glycol. The acid anhydrides include phthalic anhydride, tetrahydrophthalic anhydride, methyltetrahydrophthalic anhydride, hexahydrophthalic anhydride, methylhexahydrophthalic anhydride, methylhimic anhydride, nadic anhydride and trimellitic anhydride. The aromatic amines include 4,4'-diaminodiphenylmethane, 4,4'-diaminodiphenylpropane, 4,4'-diaminodiphenyl sulfone, m-phenylenediamine and p-xylylenediamine while the aliphatic amines include ethylenediamine, hexamethylenediamine, diethylenetriamine and triethylenetetramine. The aforementioned curing agents can be used singly or as a mixture of two or more. It is desirable to use polyphenols for encapsulation of semiconductors.

It is allowable to use common epoxy resins containing two or more epoxy groups together with bisphenol F-derived epoxy resins which are essential ingredients of the resin compositions of this invention. For example, such common epoxy resins include glycidyl ethers derived from dihydric phenols such as bisphenol A, bisphenol S, fluorenebisphenol, 4,4'-dihydroxybiphenyl, 2,2'-dihydroxybiphenyl, hydroquinone and resorcin, trihydric and higher phenols such as tris(4-hydroxyphenyl) methane, 1,1,2,2-tetrakis(4-hydroxyphenyl)ethane, phenol novolaks and o-cresol novolaks and halogenated bisphenols such as tetrabromobisphenol. These epoxy resins can be used singly or as a mixture of two or more. The proportion of the epoxy resins represented by the aforementioned general formula (1) is in the range of 50 to 100% of the entire epoxy resins.

It is possible to add inorganic fillers to the resin compositions of this invention. Suitable fillers include silica powders such as fused silica, spherical or crushed, and crystalline silica, alumina powders and glass powders and they are used preferably in an amount of 75% by weight or more from the viewpoint of low moisture absorption and high heat resistance at soldering temperature.

Known curing accelerators may be added, as needed, to the resin compositions of this invention; for example, amines, imidazoles, organic phosphines and Lewis acids. They are normally added in an amount of 0.2 to 5 parts by weight per 100 parts by weight of epoxy resins.

Furthermore, it is possible to use, as needed, the following additives in the resin compositions of this invention: mold release agents such as carnauba wax and OP wax, coupling agents such as γ-glycidoxypropyltrimethoxysilane, colorants such as carbon black, flame retardants such as antimony trioxide, stress reducers such as silicone oils and lubricants such as calcium stearate.

PREFERRED EMBODIMENTS OF THE INVENTION

This invention will be described in detail below with reference to the accompanying preparational examples, examples and comparative examples.

PREPARATIONAL EXAMPLE 1

In 960 g of epichlorohydrin was dissolved 120 g of 3,3',5,5'-tetramethyl-4,4'-dihydroxydiphenylmethane, 0.3 g of benzyltriethylammonium chloride was added to the solution and 81.3 g of a 48% aqueous solution of sodium hydroxide was added in drops under reduced pressure (approximately 150 mmHg, 70° C.) over a period of 4 hours. The water formed in this period was taken out of the system as an azeotrope with epichlorohydrin and the distilled epichlorohydrin was returned to the system. Upon completion of the dropwise addition, the reaction was continued for another hour. Thereafter, the reaction mixture was filtered to remove the salts formed, washed with water and stripped of the epichlorohydrin by distillation to give 165 g of pale yellow liquid epoxy resins. The resins thus obtained were mixed with 3 g of separately prepared fine crystalline powders of diglycidyl ether of 3,3',5,5'-tetramethyl-4,4'-dihydroxydiphenylmethane and the mixture was left standing at 30° C. to effect crystallization of the resins. The resulting crystals showed a melting point of 78° C. The epoxy equivalent of the resins was 185 and the viscosity was 45 centipoises as measured in m-cresol (solid content, 30% by weight) at 25° C.

PREPARATIONAL EXAMPLE 2

The reaction was carried out as in Preparational Example 1 by using 120 g of 2,2'-dimethyl-5,5'-di-tert-butyl-4,4'-dihydroxydiphenylmethane, 720 g of epichlorohydrin and 58.8 g of a 48% aqueous solution of sodium hydroxide to give 148 g of white crystalline epoxy resins with an epoxy equivalent of 235, a melting point of 93° C. and a viscosity of 72 centipoises as measured in m-cresol (solid content, 30% by weight) at 25° C.

PREPARATIONAL EXAMPLE 3

The reaction was carried out as in Preparational Example 1 by using 130 g of 2,2',3,3',5,5'-hexamethyl-4,4'- dihydroxydiphenylmethane, 780 g of epichlorohydrin and 76.2 g of a 48% aqueous solution of sodium hydroxide to give 176 g of white crystalline epoxy resins with an epoxy equivalent of 208, a melting point of 101° C. and a viscosity of 56 centipoises as measured in m-cresol (solid content, 30% by weight) at 25° C.

EXAMPLES 1 AND 2

Epoxy resin compositions were prepared according to the formulation shown in Table 1 by using the epoxy resins obtained in Preparational Example 1 as resin component, phenol novolak resins (PSF-4300 manufactured by Gun-ei Chemical Industry Co., Ltd) as curing agent, crushed silica (average particle diameter, 16 μm) or spherical silica (average particle diameter, 22 μm) as filler, triphenylphosphine as curing accelerator, γ-glycidoxypropyltrimethoxysilane as silane coupling agent and other additives shown in Table 1. Each composition was molded at 175° C. and postcured at 175° C. for 12 hours and the cured specimen was submitted to measurement of various properties. Each composition was also molded into an 84-pin IC, postcured at 85° C., stored at 85° C. and 85% relative humidity for 24, 48 or 72 hours to allow moisture absorption, immersed in a soldering bath at 260° C. for 10 seconds, and observed for occurrence of package cracking. The results are shown in Table 1.

EXAMPLE 3

The epoxy resins obtained in Preparational Example 2 as epoxy resin component were mixed with others, kneaded, molded, and evaluated as in Example 1. The results are shown in Table 1.

EXAMPLE 4

The epoxy resins obtained in Preparational Example 3 as epoxy resin component were mixed with others, kneaded, molded, and evaluated as in Example 1. The results are shown in Table 1.

COMPARATIVE EXAMPLE 1

An epoxy resin composition was obtained by using o-cresol novolak epoxy resins (softening point, 71° C.) as epoxy resin component, molded and evaluated as in Example 1. The results are shown in Table 1.

TABLE 1

| | Example No. | | | | Comparative Example |
|---|---|---|---|---|---|
| | 1 | 2 | 3 | 4 | 1 |
| Epoxy resin | 95 | 95 | 103 | 99 | 98 |
| Curing agent | 55 | 55 | 47 | 51 | 52 |
| Crushed silica | 550 | — | 550 | 550 | 450 |
| Spherical silica | — | 900 | — | — | — |
| Curing accelerator | 1.5 | 1.5 | 1.5 | 1.5 | 1.5 |
| Silane coupling agent | 4 | 4 | 4 | 4 | 4 |
| Carbon black | 3 | 3 | 3 | 3 | 3 |
| Carnauba wax | 3 | 3 | 3 | 3 | 3 |
| Gel time (s, at 175° C.) | 32 | 33 | 35 | 32 | 32 |
| Spiral flow (in) | 37.0 | 31.5 | 34.0 | 35.5 | 28.5 |
| Flow tester viscosity (s, at 150° C.) | 250 | 350 | 320 | 280 | 560 |
| Glass transition temperature (°C.) | 140 | 141 | 146 | 150 | 169 |

TABLE 1-continued

| | Example No. | | | | Comparative Example |
|---|---|---|---|---|---|
| | 1 | 2 | 3 | 4 | 1 |
| Linear expansion coefficient (<Tg, ×10$^{-5}$) | 1.5 | 1.0 | 1.5 | 1.5 | 1.7 |
| Linear expansion coefficient (>Tg, ×10$^{-5}$) | 5.4 | 3.5 | 5.3 | 5.4 | 6.0 |
| Flexural strength (kgf/mm$^2$) | 17.5 | 15.5 | 15.5 | 15.5 | 14.0 |
| Flexural modulus (kgf/mm$^2$) | 2030 | 2100 | 2020 | 2030 | 1810 |
| Moisture absorption (wt %) (24 h) | 0.12 | 0.10 | 0.19 | 0.11 | 0.14 |
| (48 h) | 0.17 | 0.15 | 0.14 | 0.16 | 0.22 |
| (72 h) | 0.24 | 0.22 | 0.21 | 0.23 | 0.31 |
| Occurrence of crack (24 h) | 0/10 | 0/10 | 0/10 | 0/10 | 10/10 |
| (48 h) | 0/10 | 0/10 | 0/10 | 0/10 | 10/10 |
| (72 h) | 0/10 | 0/10 | 0/10 | 0/10 | 10/10 |

EXAMPLES 5 AND 6 AND COMPARATIVE EXAMPLE 2

A powder coating was formulated as shown in Table 2 from the epoxy resins obtained in Preparational Example 1 and evaluated for melt viscosity, gel time, impregnating characteristics and blocking tendency. The results are shown in Table 2.

TABLE 2

| | Example No. | | Comparative Example |
|---|---|---|---|
| | 5 | 6 | 2 |
| Epoxy resin (Preparational Example 1) | 100 | 50 | — |
| Epikote 1001 *$^1$ | — | 50 | 100 |
| Curing agent *$^2$ | 82 | 66 | 32 |
| Curing accelerator *$^3$ | 0.5 | 0.5 | 0.5 |
| Melt viscosity (P) *$^4$ | 0.2 | 1.4 | 6.5 |
| Gel time (second) *$^5$ | 36 | 42 | 110 |
| Evenness *$^6$ | ⊚ | ⊚ | x |
| Blocking tendency (%) *$^7$ | 0 | 0 | 100 |

*$^1$:Solid bisphenol A-based epoxy resin (manufactured by Yuka Shell Epoxy K.K.)
*$^2$:Tetrahydrophthalic anhydride
*$^3$:2-Methylimidazole
*$^4$:ICI cone plate viscometer (150° C.)
*$^5$:at 180° C.
*$^6$:The powder coating was sprinkled uniformly over a hot plate (180° C.) and the film thereby formed was observed: ⊚excellent; ○good; x : poor.
*$^7$:The powder coating was left standing at 30° C. for 10 days and the weight of the powders remaining on a 60-mesh screen was determined.

EXAMPLE 7

The powder coating composition prepared in Example 5 was left standing at 30° C. for 2 weeks and evaluated as in Example 5. The composition showed a melt viscosity of 0.3 poise and a gel time of 33 seconds, formed a film of good evenness and was resistant to blocking as powder.

COMPARATIVE EXAMPLE 3

Liquid epoxy resins (30,000 centipoises at 25° C.) were prepared by following the procedure described in Preparational Example 1 until the point immediately before submission to crystallization and were kneaded with the curing agent and the curing accelerator according to the formulation of Example 5 to give a resin composition, which showed a melt viscosity of 0.3 poise at 150° C. and a gel time of 35 seconds. When left standing at 30° C. for 2 weeks and evaluated as in Example 5, the composition showed a melt viscosity of 12 poises at 150° C. and a gel time of 18 seconds.

Industrial Applicability

Epoxy resins of this invention are a crystalline solid with ease of handling, retain excellent flow in molding because of their extremely low viscosity in a molten state and can be filled with a larger quantity of silica. Thus, the resins are useful for the manufacture of powder coatings and encapsulation of semiconductors and the crack resistance of packaged semiconductor devices improves in large measure when encapsulated with the epoxy resin compositions of this invention.

What is claimed is:

1. An epoxy resin composition comprising epoxy resins selected from the group consisting of diglycidyl ether of 3,3',5,5'-tetramethyl-4,4'-dihydroxydiphenylmethane, diglycidyl ether of 2,2',3,3',5,5'-hexamethyl-4,4'-dihydroxydiphenylmethane and diglycidyl ether of 2,2'-dimethyl-5,5'-di-tert-butyl-4,4'-dihydroxydiphenylmethane, polyphenols as epoxy resin curing agents, and inorganic fillers in an amount of 75% by weight or more, wherein said epoxy resins are solidified by crystallization and have epoxy equivalent of 250 or less and hydrolyzable chlorine content of 1,500 ppm or less by crystallization.

2. Cured epoxy resins which are obtained by solidifying epoxy resins selected from the group consisting of diglycidyl ether of 3,3',5,5'-tetramethyl-4,4'-dihydroxydiphenylmethane, diglycidyl ether of 2,2',3,3',5,5'-hexamethyl-4,4'-dihydroxydiphenylmethane and diglycidyl ether of 2,2'-dimethyl-5,5'-di-tert-butyl-4,4'-dihydroxydiphenylmethane and having 250 or less of epoxy equivalent and 1,500 ppm or less of hydrolyzable chlorine content by crystallization, and curing the resulting solid by adding polyphenols as epoxy resin curing agents and adding inorganic fillers in an amount of 75% by weight or more to the resulting solid.

* * * * *